United States Patent [19]

McAdam

[11] Patent Number: 5,562,179
[45] Date of Patent: Oct. 8, 1996

[54] ADJUSTABLE DRIVE SHAFT SUPPORT FOR TRUCK FRAME

[76] Inventor: Dennis J. McAdam, 6912 N. Oatman Ave., Portland, Oreg. 97217

[21] Appl. No.: 395,864

[22] Filed: Feb. 28, 1995

[51] Int. Cl.$^6$ .................................................. B62D 21/00
[52] U.S. Cl. ........................... 180/379; 180/312; 280/781
[58] Field of Search ...................... 180/312, 374, 180/376, 377, 378, 379, 380; 280/781; 296/204; 248/333; 74/607, 609

[56] References Cited

U.S. PATENT DOCUMENTS

| | | |
|---|---|---|
| 835,547 | 11/1906 | Morse . |
| 1,066,532 | 7/1913 | Rohlfing . |
| 1,066,548 | 7/1913 | Summa . |
| 1,435,480 | 11/1922 | Kerr ............................................ 180/377 |
| 1,650,045 | 9/1925 | Riise ........................................... 180/312 |
| 1,659,017 | 2/1928 | Clark . |
| 1,668,423 | 5/1928 | Schaeffer .................................. 180/380 |
| 1,867,341 | 7/1932 | Werdrhoff . |
| 2,082,826 | 5/1936 | Frisby ......................................... 180/376 |
| 2,366,166 | 7/1943 | Willock ...................................... 280/781 |
| 2,494,115 | 1/1950 | Bock . |
| 3,042,423 | 9/1959 | Bock . |
| 3,540,756 | 11/1970 | Stout . |
| 5,314,205 | 5/1994 | Glesmann . |

FOREIGN PATENT DOCUMENTS

| | | | |
|---|---|---|---|
| 2332899 | 6/1977 | France ............................... | 180/380 |

*Primary Examiner*—Paul N. Dickson
*Attorney, Agent, or Firm*—Bennet K. Langlotz

[57] ABSTRACT

A truck frame with elongated frame rails, a plurality of cross members each spanning between and connected to each of the rails, a first and second of the cross members being spaced apart to define a gap. An elongated bridge having a first and second end is connected at its first end to an intermediate point on the first cross member, and at its second end to an intermediate point on the second cross member. A drive shaft support bearing is connected to the bridge at an intermediate location between the first and second ends. The bridge may include multiple mounting locations so that the bearing may be remounted within a selected range of positions along the bridge.

20 Claims, 2 Drawing Sheets

5,562,179

ADJUSTABLE DRIVE SHAFT SUPPORT FOR TRUCK FRAME

FIELD OF THE INVENTION

This invention relates to heavy vehicles, and more particularly to trucks having multi segment drive shafts.

BACKGROUND AND SUMMARY OF THE INVENTION

Trucks having front engines and rear wheel drive require long drive shafts to transmit torque from the engine to the rear wheels. When a drive shaft is longer than a certain length, design rules dictate that it be supported at its mid section or at multiple locations to avoid "whipping" in the manner of a taut jump rope. The shaft is segmented into segments joined by universal joints, and the end of at least one of the segments is supported by a beating attached to the truck frame adjacent the universal joint.

Typical truck frames are shaped like ladders, and the shaft support bearing is mounted to the cross members of the frame. Often, trucks must be built to customers' specifications, which may include different frame lengths. A different frame length may dictate a different number of drive shaft segments, different shaft lengths, and support bearing locations to meet design rules. This requires that the frame cross members be relocated to accommodate the bearing requirements. However, many other components are normally attached to the frame rails between the cross members (e.g. air tanks, fuel tanks, brake components, etc.) When the drive shaft beating must be moved, some or all of the components must be relocated, requiring extensive engineering time, and potentially compromising other design rules when design conflicts arise.

The disclosed apparatus overcomes these disadvantages by providing a truck frame with elongated frame rails, a plurality of cross members each spanning between and connected to each of the rails, a first and second of the cross members being spaced apart to define a gap. An elongated bridge having a first and second end is connected at its first end to an intermediate point on the first cross member, and at its second end to an intermediate point on the second cross member. The bridge may include multiple mounting locations so that the bearing may be remounted within a selected range of positions along the bridge.

DETAILED DESCRIPTION OF A PREFERRED EMBODIMENT

Figure 1:
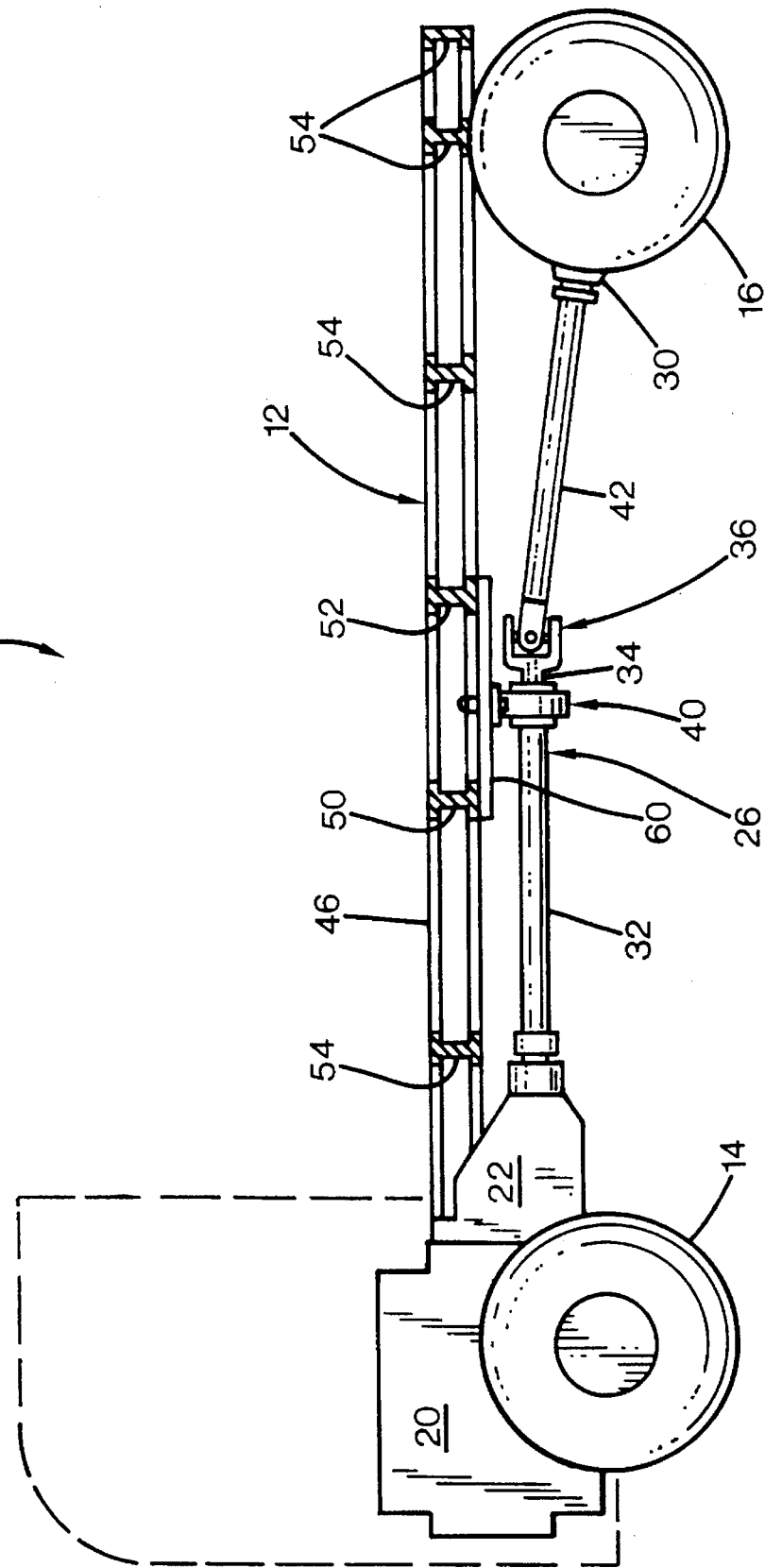
FIG. 1 is a cutaway side view of a truck according to the present invention, taken along line 1—1 of FIG. 2.

FIG. 1 shows a truck 10 according to a preferred embodiment of the invention. The invention may be embodied in any machine having a split drive shaft. The truck includes a frame 12 that is mounted by a suspension (not shown) to a set of front wheels 14 and a set of driven rear wheels 16. An engine 20 is mounted at the front of the frame 12, with a transmission 22 attached to the rear of the engine and extending rearwardly therefrom. A drive shaft assembly 26 extends rearwardly from the transmission to a differential 30 between the rear wheels 16 to transmit power to the wheels.

The drive shaft includes a first rigid shaft segment 32 extending from the rear of the transmission 22, and connected thereto by a universal joint. The first segment terminates at a rear end to which a universal joint 36 is connected. A bearing assembly 40 attached to the frame 12 captures the first shaft segment 32 near the rear end 34. The bearing assembly 40 permits rotation of the shaft while fixing the position of the rear end 34 relative to the frame. A second drive shaft segment 42 is connected to the universal joint 36 and extends to the differential 30. In alternative embodiments, additional shaft segments may be serially connected to transmit power to a more distant differential on a longer truck. In that case, an additional bearing and universal joint is required at the junction between each of the segments.

Figure 2:
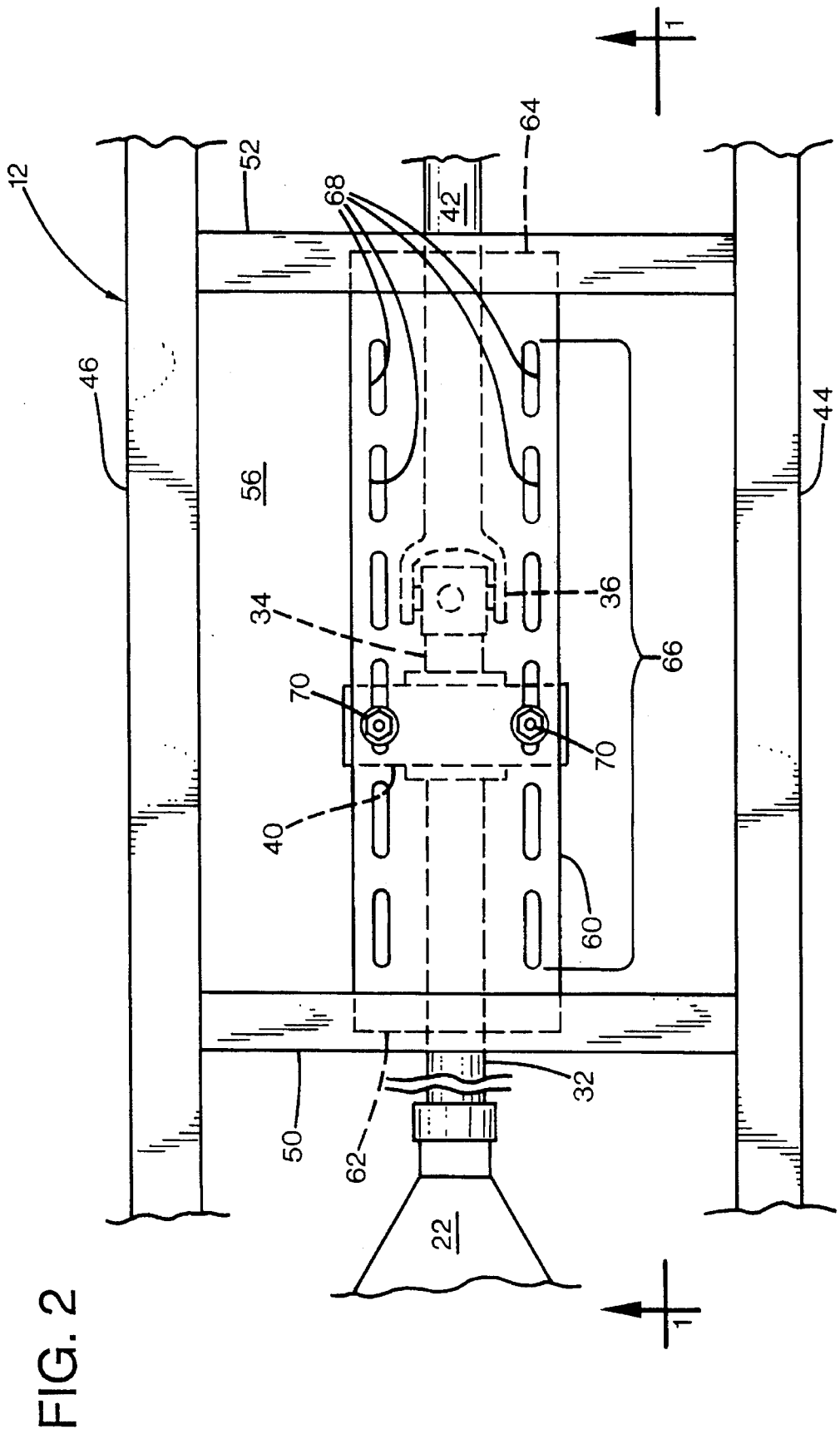
FIG. 2 is a top view of the embodiment of FIG. 1.

FIG. 2 shows a plan view of the portion of the frame 12 to which the beating assembly 40 is attached. The frame includes a pair of elongated rigid frame rails 44, 46 that extend in parallel from the from of the vehicle to the rear: A first cross member 50 and a second cross member 52 each span between the rails 44, 46. Each cross member is perpendicular to the rails and parallel to the other cross member. Other cross members 54 are provided as shown in FIG. 1.

Referring back to FIG. 2, the first and second cross members 50, 52 are spaced apart to define a gap 56. An elongated rigid bridge plate 60 oriented parallel to the frame rails 44, 46 is connected to the cross members 50, 52 to span the gap. The bridge 60 has a front end 62 connected to a mid point of the first cross member 50, and has an opposed rear end 64 connected to a mid point of the second cross member 52. The bridge, cross members and rails may be secured to each other by any reliable means such as welding, bolting, or integrally forming of some or all parts.

The bridge includes an attachment region 66 defining a plurality or range of attachment points to which the bearing assembly 40 may be attached. This permits a frame to be designed and assembled without knowing in advance where the bearing assembly must be located, with the bearing assembly being positioned later at any of a range of positions within the attachment region. The attachment region extends longitudinally along the length of the vehicle. In the illustrated embodiment, the bridge is a rigid plate defining two rows of elongated holes or slots 68, each row adjacent to a major edge of the plate and aligned parallel to the frame rails.

The bearing assembly 40 includes a pair of upwardly protruding bolts 70 that pass through respective slots 68, and are secured by nuts 74 atop the bridge 60. Alternatively, the bearing assembly may be secured with clamps attached to the edge of the bridge, or welded directly to the bridge in the desired location. The bridge need not be a plate, but may be any elongated member such as a beam, with the bearing assembly clamped or secured to the beam by any means.

Although the invention is described in terms of a preferred embodiment, it is not intended to be so limited.

I claim:

1. A truck frame comprising:

a pair of elongated frame rails;

a plurality of cross members each spanning between the frame rails and connected to each of the rails;

a first and second of the cross members being spaced apart to define a gap;

an elongated bridge having a first end and a second end, the bridge being connected at its first end to an intermediate point spaced apart from each of the frame rails on the first cross member, and at its second end to an intermediate point spaced apart from each of the frame rails on the second cross member to span the gap; and a drive shaft support bearing connected to the bridge at an intermediate location between the first and second ends.

2. The apparatus of claim 1 wherein the bridge is substantially parallel to at least one of the frame rails.

3. The apparatus of claim 1 wherein the bridge includes an attachment region extending along its length, such that the support bearing may be attached to the bridge at a number of different positions within a selected range.

4. The apparatus of claim 1 wherein the bridge defines a plurality of attachment locations at different locations along its length.

5. The apparatus of claim 1 wherein the bridge defines a plurality of mounting holes at different locations along its length.

6. The apparatus of claim 5 wherein at least some of the mounting holes comprise elongated slots oriented parallel to the frame rails.

7. The apparatus of claim 1 wherein the bridge is spaced apart from each of the frame rails.

8. A truck frame comprising:

a pair of first and second elongated frame rails;

a bridge assembly connected to the first frame rail at a plurality of spaced apart locations along the first rail, and connected to the second frame rail at a plurality of spaced apart locations along the second rail;

the bridge assembly including an elongated center portion spaced apart from the frame rails and extending substantially parallel to the rails;

a drive shaft support bearing connected to the center portion of the bridge assembly at an intermediate location along the length of the center portion, the drive shaft support bearing being positioned below the bridge assembly.

9. The apparatus of claim 8 wherein the center portion of the bridge is substantially parallel to at least one of the frame rails.

10. The apparatus of claim 8 wherein the center portion of the bridge includes an attachment region extending along its length, such that the support bearing may be attached to the bridge at a number of different positions within a selected range.

11. The apparatus of claim 8 wherein the center portion of the bridge defines a plurality of attachment locations at different locations along its length.

12. The apparatus of claim 8 wherein the center portion of the bridge defines a plurality of mounting holes at different locations along its length.

13. The apparatus of claim 12 wherein at least some of the mounting holes comprise elongated slots oriented parallel to the frame rails.

14. The apparatus of claim 8 wherein the center portion of the bridge is spaced apart from each of the frame rails.

15. The apparatus of claim 8 wherein the bridge assembly spans continuously between the frame rails, and wherein the bearing is separable from the bridge assembly.

16. The apparatus of claim 8 wherein the intermediate location is longitudinally displaced from the locations at which the bridge assembly is connected to the frame rails.

17. The apparatus of claim 8 wherein the intermediate location is a single, discrete location selected from a range of alternative bearing mounting positions along the length of the center portion.

18. A truck frame comprising:

a pair of first and second elongated frame rails;

a bridge assembly comprising a plate connected to the first frame rail at a plurality of spaced apart locations along the first rail, and connected to the second frame rail at a plurality of spaced apart locations along the second rail;

the bridge assembly including an elongated center portion spaced apart from the frame rails and extending substantially parallel to the rails;

a drive shaft support bearing connected to the center portion of the bridge assembly at an intermediate location along the length of the center portion, the intermediate location being longitudinally displaced from the locations at which the bridge assembly is connected to the frame rails.

19. The apparatus of claim 18 wherein the intermediate location is a single, discrete location selected from a range of alternative bearing mounting positions along the length of the center portion.

20. The apparatus of claim 18 wherein the center portion of the bridge assembly defines a plurality of attachment locations at different locations along its length.

* * * * *